(12) United States Patent
Allwell et al.

(10) Patent No.: US 8,196,138 B2
(45) Date of Patent: Jun. 5, 2012

(54) METHOD AND SYSTEM FOR MIGRATING VIRTUAL MACHINES BETWEEN HYPERVISORS

(75) Inventors: Claus Allwell, Stuttgart (DE); Michael Behrendt, Randersacker (DE); Gerd Breiter, Wildberg (DE); Sebastian Ott, Gera (DE); Hans-Joachim Picht, Glessen (DE); Jens Wollenhaupt, Kassel (DE)

(73) Assignee: International Business Machines Corporation, Armonk, NY (US)

( * ) Notice: Subject to any disclaimer, the term of this patent is extended or adjusted under 35 U.S.C. 154(b) by 1114 days.

(21) Appl. No.: 12/050,378

(22) Filed: Mar. 18, 2008

(65) Prior Publication Data

US 2008/0263258 A1 Oct. 23, 2008

(30) Foreign Application Priority Data

Apr. 19, 2007 (EP) .................................... 07106493

(51) Int. Cl.
*G06F 9/455* (2006.01)
(52) U.S. Cl. ........................................................... 718/1
(58) Field of Classification Search ........................ None
See application file for complete search history.

(56) References Cited

U.S. PATENT DOCUMENTS

2007/0143315 A1* 6/2007 Stone ........................... 707/100
2007/0180436 A1* 8/2007 Travostino et al. ............ 717/138

OTHER PUBLICATIONS

VMware Virtual Machine Importer User's Manual, copyright 2006.*
CA VMware, Inc., "VMware Converter for workstation to virtual pc and virtual machine migration"; Apr. 24, 2007; 2 pages; www.vmware.com/products/converter.
CB XenSource, Inc., The Xen™ virtual machine monitor; Apr. 24, 2007; 2 pages; www.cl.cam.ac.uk/research/srg/netos/xen; 2007 University of Cambridge Computer Laboratory.
CC QEMU—Wikipedia; Apr. 24, 2007; 3 pages; http://de.wikipedia.org/wiki/QEMU (in German).

* cited by examiner

*Primary Examiner* — Emerson Puente
*Assistant Examiner* — Gregory Kessler
(74) *Attorney, Agent, or Firm* — Yudell Isidore Ng Russell PLLC

(57) ABSTRACT

A method for migrating virtual machines between hypervisors is disclosed. Initially, metadata describing a virtual machine are automatically scanned and parsed. The structure of the metadata of a source virtual machine are automatically analyzed. Elements of this structure are mapped to corresponding entries of a target virtual machine. A target metadata descriptor to be used as part of the target virtual machine is generated. A predefined layout description of the data stored in a file system image of the source virtual machine read. A predefined layout description of the data to be stored in a file system image to be used at the target virtual machine is also read. The data are extracted from the source virtual machine. A template of a file system image for the target virtual system is generated. Storage space corresponding to the target virtual machine is allocated, and the extracted data are inserted into the allocated storage space.

12 Claims, 5 Drawing Sheets

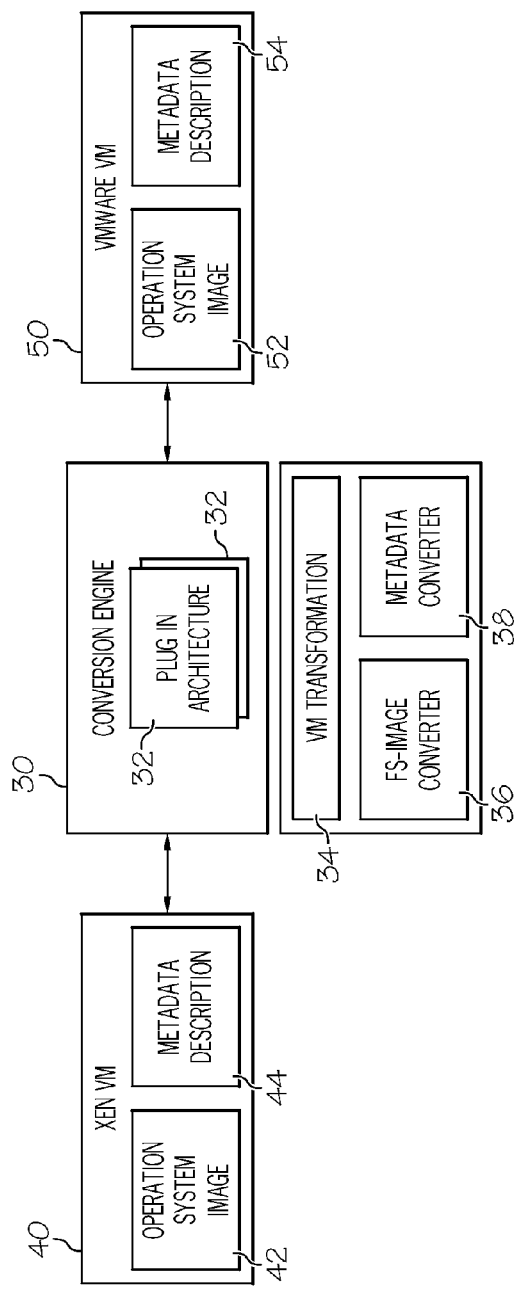
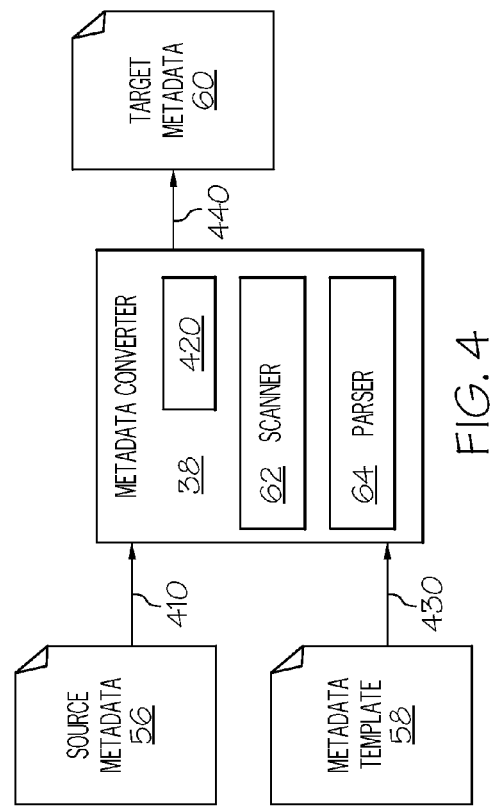
FIG. 3
FIG. 4

```
KDMV
# Disk DescriptorFile
version=1
CID=00c32f96
parentCID=ffffffff
createType="monoliticSparse"
#Extent description
RW 8388608 SPARSE "vm66.vmdk<<

#The Disk Data Base
#DDB
ddb.toolsVersion = "6530"
ddb.virtualHWVersion = "3"
ddb.geometry.cylinders = "8322"
ddb.geometry.heads = "16"
ddb.geometry.sectors = "63"
ddb.adapterTyper = "ide"
```

METHOD AND SYSTEM FOR MIGRATING VIRTUAL MACHINES BETWEEN HYPERVISORS

PRIORITY CLAIM

The present application claims priority under 35 U.S.C. §119(e)(1) to EP application number 07106493.5, filed on Apr. 19, 2007, the contents of which are incorporated herein by reference.

BACKGROUND OF THE INVENTION

1. Technical Field

The present invention relates to computer virtualization in general, and in particular to computer virtualization in which computer resources are emulated and simulated in order to offer the possibility of replacing the computing resources by a central computer network in order to offer more efficient computing facilities.

2. Description of Related Art

In the context of computer science, virtualization generally refers to the emulation and simulation of computer resources. While abstraction usually hides details, virtualization is about creating illusions. Thus, with virtualization, instead of hiding the physical characteristics of computing resources from the way in which other systems, applications, or end users interact with the computing resources, the computing resources are usually emulated and simulated in order to behave in a virtualized environment in the same way they would do on native hardware. A virtualized system's interface and resources are mapped onto respective interface and resources of a physical computer system.

With reference now to the drawings, and in particular to FIGS. 1 and 2, there are depicted block diagrams of two basic architectural system structures of a conventional virtualization system. As shown, a virtualization system 10 includes a hypervisor (or a virtual machine monitor) 12 for providing mapping between hardware 14 and a group of guest operating systems (OSs) 16 running on a host computer. Hypervisors 12 can be classified under two types:

a. Type 1 hypervisor runs directly on hardware 14, as shown in FIG. 1. Guest OSs 16 runs on the second level above hardware 14. An example of this kind of hypervisor technology is commercially available under the product name "Xen."

b. Type 2 hypervisor runs within an operating system environment, as depicted in FIG. 2. Guest OSs 16 are executed on the third level above hardware 14. An example of this kind of hypervisor technology is commercially available under the product name "VMware server."

In addition, there are two basic prior art techniques for providing server virtualization, namely, full-virtualization and para-virtualization. Full-virtualization completely virtualizes the hardware infrastructure needed to run an OS and the applications on top of the OS. This virtualized hardware infrastructure is referred to as "virtual machine." Examples of hypervisor implementations utilizing the full-virtualization approach are VMware hypervisor and Microsoft[7] Virtual PC/Server.

Para-virtualization, in contrast, emulates only parts of the hardware infrastructure needed to run an OS and is "transparent" for some (performance-critical) parts, which provides performance gains. An example of hypervisor implementation utilizing the para-virtualization approach is the open source hypervisor Xen.

With respect to the application of virtualization, the following situation can be considered as typical. A data center is assumed to host virtual machine instances on a pool of servers. Due to the fact that current virtualization technologies, such as VMware and Xen, can only exclusively run on a certain "hardware box," i.e. a computer system or a cluster of computer systems including computational, storage and network resources, a specific amount of hardware resources has to be provided in order to react to changing customer demands and hardware resource requirements (due to changing degrees of utilization of this hardware box).

Let's assume the following scenario. Two different host platforms A and B exist. One is running virtualization technology X and the other virtualization technology Y. While system A running X is under heavy workload, system B using Y is idle at the moment and it is expected to be idle even for a longer time. Thus, in this scenario, it is desirable to balance the workload between system A and system B by transferring some load from A to B. However, such workload transfer between systems is not feasible in prior art.

One idea for balancing the workload would be to convert virtual machine images, in this case, to increase the load of system B and to decrease the load of system A. There are currently several prior art implementations available for converting virtual machine images:

First, there is the VMware Conversion tool. This is a freely available tool for converting older VMware virtual or Microsoft Virtual PC/Server virtual machines into virtual machines being able to run on the latest VMware hypervisor products. From a conceptual perspective, this (one-way) conversion converts virtual machines being based on full-virtualization to virtual machines also being based on full virtualization.

However, the VMware Conversion tool does not allow converting virtual machines capable of running on VMware to virtual machines capable of running on a different hypervisor. For example, the VMware conversion tool does not provide functionality to migrate virtual machines from Xen (as a para-virtualization-based hypervisor) to VMware and vice versa.

Other prior art software projects focus on the migration of a real server to virtual ones. The Virtual Server Migration Toolkit (VSMT) from Microsoft[7] can be named as an example. This software makes use of another Microsoft[7] product the Automated Deployment Services, to take an image of a physical server, creates the new virtual server, and then deploys the image to the Microsoft[7] Virtual Server 2005. In this case, a new image as well as the corresponding metadata is generated based on physical resources which are analyzed and virtualized. The disadvantage of this approach is that it is again only a one-way solution allowing to generate virtual machines being able to run on Microsoft[7]'s Virtual Server software. It does not allow generating virtual machines being able to run on a different hypervisor. Besides that, it does not allow VMware-based virtual machines (being based on a full-virtualization approach) to migrate to Xen-based virtual machines (being based on a para-virtualization approach).

There are other products in the market focusing on the pure conversion of file system images (representing one part of a virtual machine). One example is the image converter being delivered with the qemu Open Source project. The disadvantage of this converter is that it does not take into account the metadata of a virtual machine, which makes the overall conversion incomplete.

Consequently, it would be desirable to provide an improved method for migrating virtual machines between hypervisors.

SUMMARY OF THE INVENTION

In accordance with a preferred embodiment of the present invention, virtualization cooperation between two different computer system environments controlling virtual computing resources is provided. This cooperation enables administrators to shutdown one virtual machine on a system A, to migrate and start it again using a different virtualization technology than prevailing in system A on a system B. Initially, metadata describing a virtual machine are automatically scanned and parsed. The structure of the metadata of a source virtual machine are automatically analyzed. Elements of this structure are mapped to corresponding entries of a target virtual machine. A target metadata descriptor to be used as part of the target virtual machine is generated. A predefined layout description of the data stored in a file system image of the source virtual machine read. A predefined layout description of the data to be stored in a file system image to be used at the target virtual machine is also read. The data are extracted from the source virtual machine. A template of a file system image for the target virtual system is generated. Storage space corresponding to the target virtual machine is allocated, and the extracted data are inserted into the allocated storage space.

All features and advantages of the present invention will become apparent in the following detailed written description.

BRIEF DESCRIPTION OF THE DRAWINGS

The invention itself as well as a preferred mode of use, further objects, and advantages thereof, will best be understood by reference to the following detailed description of an illustrative embodiment when read in conjunction with the accompanying drawings, wherein:

FIG. 3 is a block diagram of basic functional components used in a virtualization method in accordance with a preferred embodiment of the present invention;

FIG. 4 is a block diagram of basic structural components used in a virtualization method in accordance with a preferred embodiment of the present invention;

DETAILED DESCRIPTION OF A PREFERRED EMBODIMENT

Figure 1:
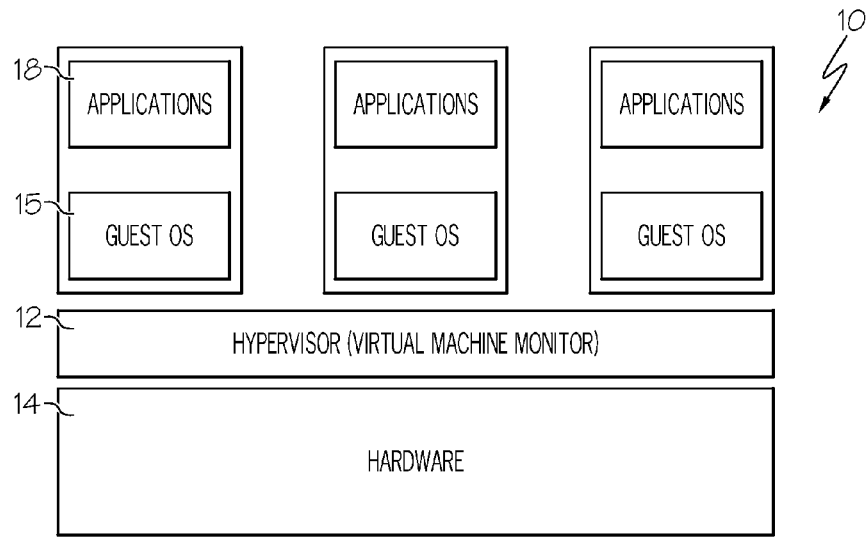
FIGS. 1 and 2 are block diagrams of basic structural components used in conventional virtualization methods.
Figure 2:
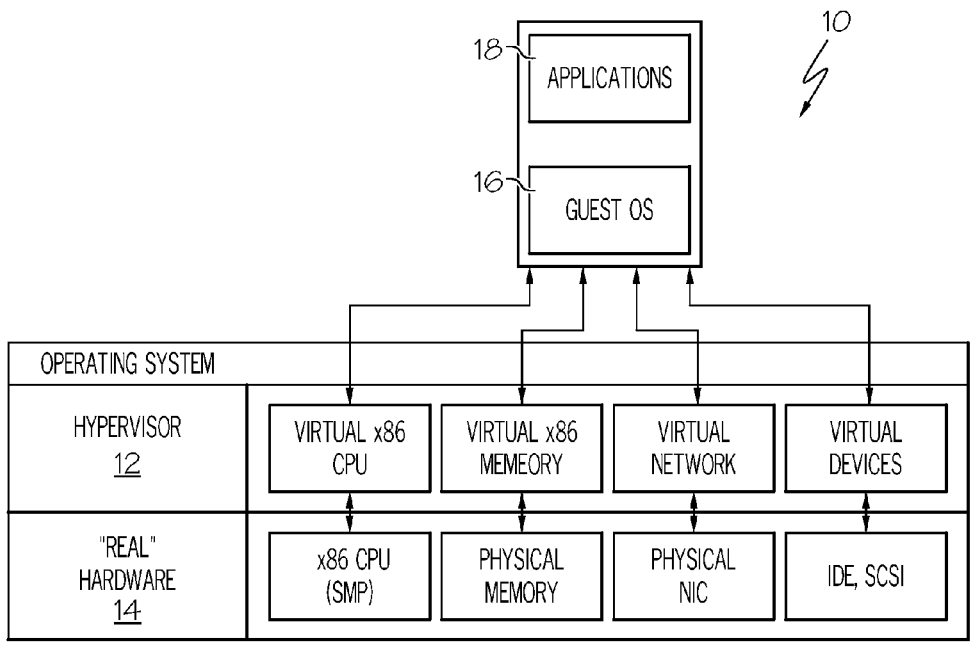

Referring now to FIG. 3, there is depicted a block diagram of basic functional components used in virtualization, in accordance with a preferred embodiment of the present invention. It shows a method for converting virtual machines from the VMware hypervisor technology to the Xen hypervisor technology. From a conceptual perspective, the system is split into two components: one for handling the conversion of the metadata describing the virtual machine and one handling the conversion of the actual image file. The present invention defines these components through an extensible plug-in approach.

As shown, a source virtual machine 40 (here Xen) includes an operating system image 42, the corresponding metadata descriptor 44, and an exact description of the metadata of virtual machine 40. Virtual machine 40 is the one which shall be converted to the target format (here VMware in this example). Source virtual machine 40 is provided by a client wanting to trigger the conversion as an input to a conversion engine 30 provided by the present invention.

The name of target hypervisor 50, to which a client wants to transform the source virtual machine is also provided as an input to the conversion engine. In this pure Xen/VMware conversion scenario, the value of this parameter is either Xen or VMware. The value of this parameter can also be more specific, e.g., in terms of the version of the target hypervisor.

Conversion engine 30 provides the actual conversion of the virtual machine, with details as described further below. Conversion engine 30 by itself defines its input and out parameters. In order to keep the actual conversion process generic, conversion engine 30 allows according to a specific advantageous aspect to dynamically plugin the actual conversion logic as plugins implementing certain, well-defined interfaces.

Multiple conversion plugins 32 are plugged into conversion engine 30. Each of conversion plugin 32 implements logic and encapsulates all knowledge needed for the conversion of one type of virtual machine to a different one. In this case of VMware/Xen conversion, there is one conversion plugin 34 realizing this type of conversion.

Each of conversion plugins 32 includes metadata for defining which source/target hypervisor types and versions are being supported. Due to changing specifications for virtual machines, it is preferable to have conversion plugins for specific versions of the same hypervisor type. In particular, two functional components 36, 38 are comprised of a transformation component, i.e., conversion plugin 34, implementing the logic for the conversion of each and any needed element of the conversion process, with details given further below.

From a functional perspective, converted virtual machine 50 is equal to source virtual machine 40, but converted virtual machine 50 is able to run on a hypervisor specified by a target hypervisor parameter. Converted virtual machine 50 includes an OS image 52 and a metadata description 54, the data which is an output from the conversion process of the present invention.

The conversion of metadata will be described in more detail, which is required in order to perform the migration of the metadata from the source hypervisor to the target hypervisor.

With reference now to FIG. 4, the metadata of a virtual machine system is processed by a scanner 62 and a parser 64 being implemented by each conversion plugin. These functional components are implemented as subcomponents of any above-mentioned conversion plugins 32, analyze the structure of the metadata descriptor of the source virtual machine and map the elements of this structure to corresponding entries of the target virtual machine, thus generating a new metadata descriptor being used as a part of the converted virtual machine.

In particular, in a step 410, the metadata descriptor of the source virtual machine is parsed. The following lines show an exemplary excerpt of entries in a source metadata file of a VMware virtual machine:

ethernet0.generatedAddress="00:11:22:33:44:55"
    ethernet0.generatedAddressOffset="0"

Metadata converter 38, which is implemented as a subcomponent of conversion plugins 32 of conversion engine 30, analyses source metadata descriptor 56 and maps source entries to the corresponding values of target metadata 60 based on well-defined mapping rules, via step 420. For example, the exemplary entries of the above-mentioned source metadata descriptor are written into the Xen target metadata file as follows:

vif=['mac=00:11:22:33:44:55']

The conversion basically works like a decode and dispatch interpreter, which means that each entry of the metadata description is extracted, converted appropriately and then written to the respective target metadata description.

For performance and simplification reasons, metadata template files are used for the following purpose: the conversion plugin only has to copy the template and change certain values instead of generating complete new configuration files each time.

An exemplary excerpt of the template file is shown as follows:

disk=['file:XXPATHXX,hda,w']
    memory=XXMEMXX
    name='XXNAMEXX'
    vif=['mac=XXMACXX']

After metadata converter 38 has analyzed that the source metadata descriptor contains the entry ethernet0.generatedAddress="00:11:22:33:44:55", the numeric entry at the end (the MAC address) is extracted and stored as the corresponding value for the MAC address in memory. Afterwards, the template is used in step 420 and the value of the MAC address, here: XXMACXX is replaced with "00:11:22:33:44:55"

Finally, all converted values are stored in the metadata target file and checked for validity, via step 440.

The above-mentioned, well-defined mapping rules are preferably based on regular expression. A regular expression is a string that is used to match against other strings. It has a special syntax that allows forming a kind of template against which the other strings can be matched.

Patterns (regular expressions can be regarded as such) give a concise description of a string set, without having to list all of its elements. For example, the set containing the following three strings:

ethernet0.generatedAddress,
    ethernet1.generatedAddress,
    ethernet2.generatedAddress can be described by the pattern "ethernet[0-9]".generatedAddress.

In order to convert metadata from one hypervisor to another, at least three items of information are necessary:

i. a pattern for identifying source information;
    ii. a pattern for extracting needed data; and
    iii. a pattern for describing target information in a way that the data that is extracted in ii. can be easily inserted into the target.

Figure 5:
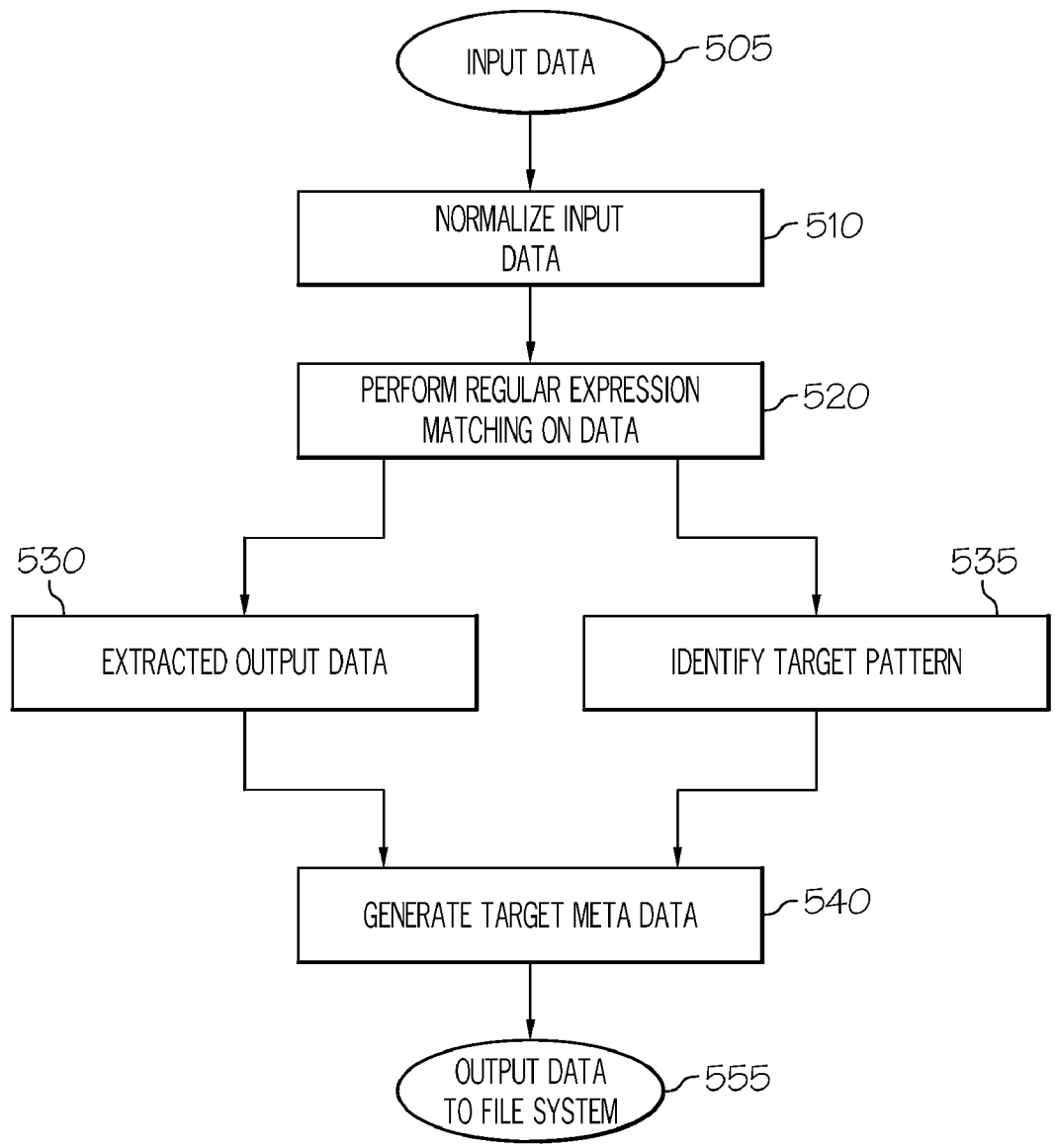
FIG. 5 is a high-level logic flow diagram of a method for migrating virtual machines between hypervisors, in accordance with a preferred embodiment of the present invention.

FIG. 5 shows how the mapping mechanism works. It is simplified in a way that the mapping component that is part of the plugin-architecture does not receive direct input. Instead, it is called by converter component 38 that identifies the source and the target format as shown in FIG. 4.

Initially, source metadata file 56 (from FIG. 4) is read, as shown in step 505, and is then normalized, as depicted in step 510. Afterwards, a pattern matching is performed by means of regular expressions in order to identify metadata components that usually includes a descriptive part and a data part, as shown in step 520, (e.g., ethernet0.generatedAddress="00:11:22:33:44:55").

In this case, ethernet0.generatedAddress is the descriptive part and "00:11:22:33:44:55" is the data part.

After identifying a pattern by means of the matching procedure, two steps are then performed: to extract the data from the source metadata, as shown in step 530, and to identify how the corresponding value has to look in the target system, as depicted step 535.

With this information, the target metadata are generated, as shown in step 540. In order to do this, the patterns are assembled in order to generate the needed target metadata. Then, the metadata is finally written to the file system (which may reside on a hard disk) after it was checked for validity, as depicted in step 555.

Figure 6:
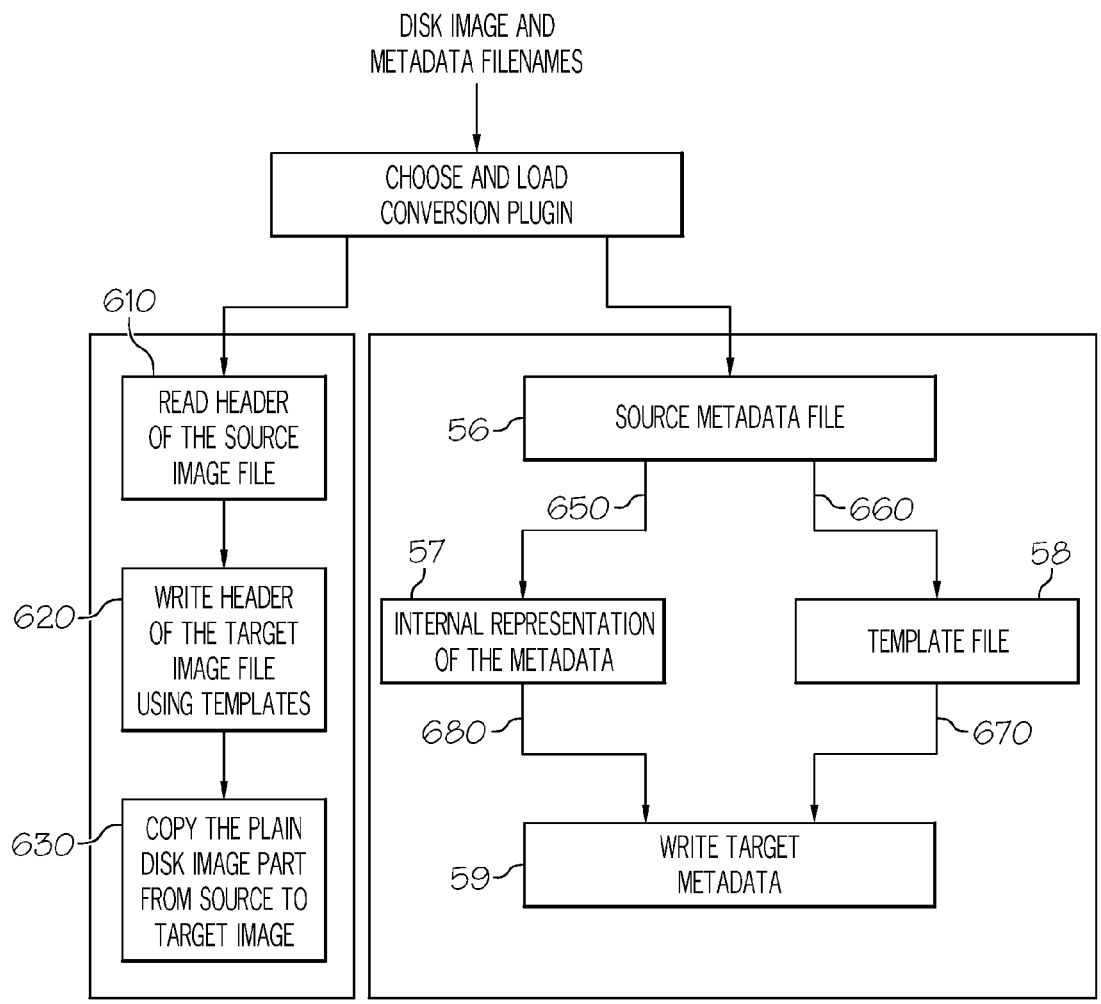
FIG. 6 is a depiction according to FIG. 5 illustrating the control flow when converting the respective disc image of the source virtual machine.
Figures 7, 8:
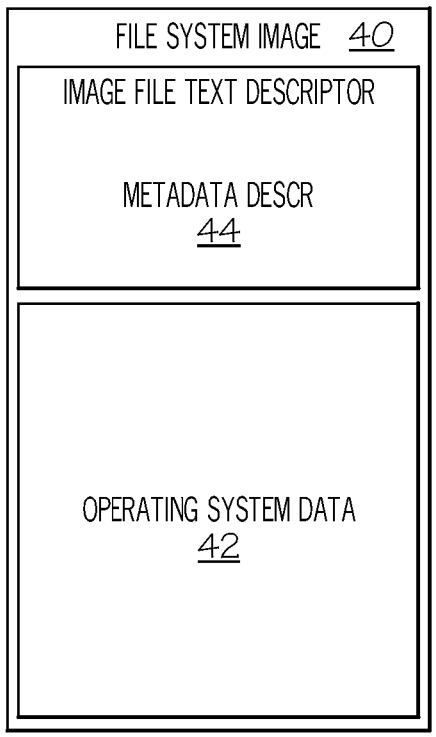
FIG. 7 is a block diagram of the basic structure of the file system image of a virtual machine.
FIG. 8 illustrates an example of "real file system content," which is embedded in a file that is part of a virtual disk used to describe the layout of data stored in a virtual disk.

The migration of virtual hard disks is described in more detail in FIGS. 6, 7 and 8. The left side of FIG. 6 shows the actual control flow and the basic steps thereof during migration of the file system.

After respective conversion plugin 32 has successfully been selected and loaded, the header of source image file 42 (from FIG. 3) is read, as shown in step 610. Then, the header of target image file 52 (from FIG. 3) is written using respective templates, as depicted in step 620. Then, the plain disk image part is copied from the source to the target image, as shown in step 630.

Virtual machines typically use virtual disks. The virtual disks, stored as files on the host computer or on a remote storage device, appear to the guest operating systems as normal disk drives. The virtual disks have to use backing storage contained in a single file. In order to be compliant with the requirements of the conversion engine all of the disk space needed for a virtual disk's files has to be allocated at the time the virtual disk is created.

The right side of FIG. 6 reflects the steps of the conversion engine in which the target format of a filesystem image is chosen based on a template file 58, as shown in step 660. Source meta file 56 is analyzed, as shown in step 650, and is stored within an internal representation 57 of the meta data within memory before being inserted into a prior loaded template file 670, as depicted in step 680. The result is written in file 59.

It should be noted that, preferably, the metadata migration/creation is executed concurrently with the virtual image creation and conversion. In cases where the generation of the file system needs information deliverable by the metadata, this information is read and evaluated first. Further, in other cases, the generation of the metadata need information from creating the file system. So, a respective appropriate sequence of steps is performed which allows a consistent structure information structure.

FIG. 7 illustrates the contents of a file system image 40. As shown, file system image 40 includes an image file text descriptor part 44 and an image part 42.

VMware uses a text descriptor to describe the layout of the data in the virtual disk. This is embedded in a file that is part of a virtual disk, starting at the beginning of the virtual disk, followed by the "real" file system content, as shown in FIG. 8.

The design of a file according to FIG. 8 is described in the VMware vmdk specification (http://www.vmware.com/proc/vmdk/downloadspec.php?src=vmdk).

Most of the entries of FIG. 8 are fixed and must be specified in the template file of the present invention. The following explanatory comments are given:

The version is the version number of the descriptor. The default value is 1 and fixed.

The field CID is a random 32-bit value updated on the first write every time the virtual disk is opened.

The field parentCID is also a fixed value, containing a not-used link to possible parent file image.

The entry createType specifies the type of the virtual disk.

The field Extend description is composed of the following parts: Access, Size in sectors (in 512 bytes), Type of Extend and Filename. In case of a single image file only one extend has to be specified.

The entries below Disk Database contain additional information about the virtual disk. The geometry values—for cylinders, heads, and sectors—are initialized with the Geometry of the disk, which depends on the adapter type, here: IDE. Usually the number of cylinders of a disk drive exactly equals the number of tracks on a single surface in the drive. Since an individual data block is one sector of a track, blocks can be addressed by specifying the cylinder, head and sector numbers of the block.

RW 8388608 means that the file vmn66.vmdk is 8388608 sectors*512 bytes=4294967296=4096 MB=4 GB. RW allows read and write operations.

The variable Cylinders is composed as follows: Cylinders=(VMDK Byte Size−512)/(Heads*Sectors*Bytes per Sector)=(4294967296−512)(16*63*512)=4294966784/516096=8322.

This calculation works basically the same way as in the context of "real" hard disks. A disk with C cylinders, H heads and S sectors per track has C*H*S sectors in all, and can store C*H*S*512 bytes.

For example, if the disk label says C/H/S=4092/16/63, then the disk has 4092*16*63=4124736 sectors, and can hold 4124736*512=2111864832 bytes (2.11 GB). There is an industry convention to give C/H/S=16383/16/63 for disks larger than 8.4 GB, and the disk size can no longer be read off from the C/H/S values reported by the disk.

In the beginning of the calculation of the VMware disk image file 512 bytes are removed, because they contain the header file describing the image which doesn't exist in the case of "real" hard disks.

All other values are fixed. In case of converting a plain disk image (coming from a Xen-based virtual machine) to a VMware virtual disk, the image file text description template is inserted at the beginning of the file system image and filled with the calculated values based on the source image file.

For the other direction from VMware to Xen basically the description within the header file is parsed. Based on these values the operating system data is extracted and written into a separate file, containing the target image.

The present invention can take the form of an entirely hardware embodiment, an entirely software embodiment or an embodiment containing both hardware and software elements. In a preferred embodiment, the present invention is implemented in software, which includes but is not limited to firmware, resident software, microcode, etc.

Furthermore, the present invention can take the form of a computer program product accessible from a computer-usable or computer-readable medium providing program code for use by or in connection with a computer or any instruction execution system. For the purposes of this description, a computer-usable or computer readable medium can be any apparatus that can contain, or store the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk, read only memory (CD-ROM), compact disk, read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Network adapters may also be coupled to the system to enable the data processing system to become coupled to other data processing systems or remote printers or storage devices through intervening private or public networks. Modems, cable modem and Ethernet cards are just a few of the currently available types of network adapters.

As has been described, the present invention provides an improved method for migrating virtual machines cross hypervisors.

While the invention has been particularly shown and described with reference to a preferred embodiment, it will be understood by those skilled in the art that various changes in form and detail may be made therein without departing from the spirit and scope of the invention.

What is claimed is:

1. A method for functionally equalizing two different virtual machines, said method comprising:
   parsing a source metadata file of a source virtual machine;
   extracting specific elements within a plurality of entries of said source metadata file according to a metadata file template having corresponding entries for supporting a target virtual machine;
   generating a target metadata file by inserting said extracted elements into said metadata file template;
   determining characteristics of a source file system image of said source virtual machine;
   utilizing said determined characteristics of said source file system image to generate a header for a target file system image;
   copying a plain disk image part of said source file system image to said target file system image; and
   combining said target metadata file and said target file system image to form said target file system image for said target virtual machine such that said target virtual machine becomes functionally equivalent to said source virtual machine.

2. The method of claim 1, wherein said plain disk image includes an operating system image.

3. The method of claim 1, wherein said source virtual machine is a Xen-based virtual machine, and said target virtual machine is a VMware-based virtual machine.

4. A method for functionally equalizing two different virtual machines, said method comprising:
   parsing a source metadata file of a source virtual machine;

extracting specific elements within a plurality of entries of said source metadata file according to a metadata file template having corresponding entries for supporting a target virtual machine;

generating a target metadata file by inserting said extracted elements into said metadata file template;

extracting a plurality of parameters from a header of a source image file stored in a source file system image of said source virtual machine, wherein said plurality of parameters describe said source file system image;

utilizing said extracted parameters to copy a plain disk image part of said source file system image to a target file system image to be used at said target virtual machine; and combining said target metadata file and said target file system image to form said target file system image for said target virtual machine such that said target virtual machine becomes functionally equivalent to said source virtual machine.

5. The method of claim 4, wherein said plain disk image includes an operating system image.

6. The method of claim 4, wherein said source virtual machine is a VMWare-based virtual machine, and said target virtual machine is a Xen-based virtual machine.

7. A computer storage medium having a computer program product for functionally equalizing two different virtual machines, said computer storage medium comprising:

computer program code for parsing a source metadata file of a source virtual machine;

computer program code for extracting specific elements within a plurality of entries of said source metadata file according to a metadata file template having corresponding entries for supporting a target virtual machine;

computer program code for generating a target metadata file by inserting said extracted elements into said metadata file template;

computer program code for determining characteristics of a source file system image of said source virtual machine;

computer program code for utilizing said determined characteristics of said source file system image to generate a header for a target file system image;

computer program code for copying a plain disk image part of said source file system image to said target file system image; and computer program code for combining said target metadata file and said target file system image to form said target file system image for said target virtual machine such that said target virtual machine becomes functionally equivalent to said source virtual machine.

8. The computer storage medium of claim 7, wherein said plain disk image includes an operating system image.

9. The computer storage medium of claim 7, wherein said source virtual machine is a Xen-based virtual machine, and said target virtual machine is a VMware-based virtual machine.

10. A computer storage medium having a computer program product for functionally equalizing two different virtual machines, said computer storage medium comprising:

computer program code for parsing a source metadata file of a source virtual machine;

computer program code for extracting specific elements within a plurality of entries of said source metadata file according to a metadata file template having corresponding entries for supporting a target virtual machine;

computer program code for generating a target metadata file by inserting said extracted elements into said metadata file template;

computer program code for extracting a plurality of parameters from a header of a source image file stored in a source file system image of said source virtual machine, wherein said plurality of parameters describe said source file system image;

computer program code for utilizing said extracted parameters to copy a plain disk image part of said source file system image to a target file system image to be used at said target virtual machine; and computer program code for combining said target metadata file and said target file system image to form said target file system image for said target virtual machine such that said target virtual machine becomes functionally equivalent to said source virtual machine.

11. The computer storage medium of claim 10, wherein said plain disk image includes an operating system image.

12. The computer storage medium of claim 10, wherein said source virtual machine is a VMWare-based virtual machine, and said target virtual machine is a Xen-based virtual machine.

\* \* \* \* \*